United States Patent [19]

Onoe et al.

[11] Patent Number: 4,621,368
[45] Date of Patent: Nov. 4, 1986

[54] DIGITAL TRANSMISSION SYSTEM

[75] Inventors: Seizo Onoe, Yokohama; Takeshi Hattori, Musashino, both of Japan

[73] Assignee: Nippon Telegraph & Telephone Public Corporation, Tokyo, Japan

[21] Appl. No.: 625,153

[22] Filed: Jun. 27, 1984

[30] Foreign Application Priority Data

Jun. 27, 1983 [JP] Japan .................. 58-116671

[51] Int. Cl.$^4$ .............................................. H04L 1/08
[52] U.S. Cl. ........................................ 375/40; 375/19; 375/100; 371/69
[58] Field of Search ............... 375/17, 19, 38, 40, 375/100; 371/43, 56, 69; 455/63, 65

[56] References Cited

U.S. PATENT DOCUMENTS

| | | | |
|---|---|---|---|
| 3,344,353 | 9/1967 | Wilcox | 371/69 |
| 3,781,794 | 12/1973 | Morris | 371/69 |
| 4,253,185 | 2/1981 | Danielson | 371/56 |

Primary Examiner—Benedict V. Safourek
Attorney, Agent, or Firm—Cushman, Darby & Cushman

[57] ABSTRACT

Fast and deep fading tends to occur in the communication between a fixed base station and a mobile station which is carried on an automobile travelling in an urban area. When connection control signals or other digital code pattern need to be transmitted between the mobile station and the fixed station, it is necessary to provide a protection system against fading. This invention relates to a protection system of the type wherein a transmitter repeats identical information for plural times and by inverting polarity. The bit error rate against fading will be thus improved and moreover, even if there is a deviation in the pattern arrangement of codes, the DC component unbalance may be avoided. The receiver evaluates the receiving condition and receives selectively the identical information which has been repeatedly transmitted. The invention provides plural circuit systems which are effective for evaluation and selection.

6 Claims, 18 Drawing Figures

DIGITAL TRANSMISSION SYSTEM

FIELD OF THE INVENTION

This invention relates to a digital signal transmission system, and more particularly to a system which repeatedly transmits the same information in order to accurately transmit codes such as control signals over a transmission line where conditions are not always desirable, for example, in mobile radio communication systems.

BACKGROUND OF THE INVENTION

A conventional system is known which conducts redundant transmission by repeating the same information for a plural number of times so as to minimize the number of bit errors on a transmission line. According to this system, as the number of repeating increases, the redundancy will increase to improve the accuracy of information which is to be transmitted. However, since the mark rate of a series of information is not necessarily 50%, a DC component will be generated in the signal which presents difficulties over transmission lines and circuits of the DC cut type. Moreover, if marks or spaces are continuously included in a code to be transmitted, it becomes difficult to extract clock signals.

A split phase code is also known, as a system which repeatedly transmits identical codes continuously in positive and negative polarities. The code is shown in FIG. 1 wherein the letter M stands for a mark of one bit information and the letter S stands for a space. In this code system, as the polarity always inverts within one bit information, no DC component will occur in the signal. Further, as the signal level repeatedly crosses the zero level, clock signals can always be extracted. However, when a split phase code is transmitted to a line having pulsating noise or short cycle fading, the error rate is not necessarily improved since repeating information follows, one after another, closely timewise and correlation with the same noise or fading becomes large.

In the split phase code, as the polarity inverts at the center of a bit, the eye pattern thereof will have wide open eye apertures 21 and small open eye apertures 22 as shown in FIG. 2. If a transmitted information signal is random, the probability that it will pass through these two eye apertures 21 and 22 is ½ respectively. When a code passes through a small open eye aperture 22 at the probability of ½, it is likely to be subjected to inter-code interference.

SUMMARY OF THE INVENTION

Accordingly, the present invention aims at obviating such prior art defects and at providing a signal transmission system which has a small correlation to noise or fading, even if the same information is repeatedly transmitted, and which is less likely disturbed by inter-code interference. Another object of this invention is to provide a system which is capable of transmitting signals which are not unbalanced in DC components thereof. Still another object of this invention is to provide a system which can transmit signals from which clock signals are easily extracted.

This invention is characterized in that the same information is transmitted for plural times n at an interval of two time slots or more in one polarity and another polarity opposite thereto, and that the number of transmissions of one polarity is programmed to be identical to that of the opposite polarity when the plural number n is an even number while the difference between the number of transmissions of one polarity and that of another polarity is programmed to be 1 when the plural number n is an odd number.

The receiver according to the present invention may be constructed with a means to evaluate the quality of a received signal and to output an index value thereof, a means to accumulate the index value temporarily, a means to hold a decoded signal temporarily, and a means to compare said index values corresponding to the same information received in plural times n so as to select a decoded code corresponding to the best signal having the highest index value.

It may further comprise a means to align in polarity the decoded code of said polarity and a code of another polarity and a means to integrate signals of the corresponding time slots of the same information which are aligned in polarity by said means.

It may further comprise a means to weight a code which has been decoded according to said index value and a means to integrate signals of the corresponding time slots of the same information which have been matched in polarity, and weighted.

It may further comprise a means to compute a differential coefficient against the time of said index value and a means to select the latter information out of two identical informations which have been twice received when said differential coefficient is positive, and to select the former information out of the two when said differential coefficient is negative.

The receiver may further comprise a means to value-detect the quality of received signals and output the index value thereof, a means to compare the index value with a reference value and a means to select the information of which index value exceeds the reference value out of the same information which have been received at plural times.

EFFECT OF THE INVENTION

According to this invention, as identical information is repeatedly transmitted at a particular interval, the probability for the information to be affected by the same noise will become less, thereby enabling effective redundant transmission. That is redundancy is effectively used in order to improve error rates. As the polarity is inverted when information is repeatedly transmitted, the mark rate will become ½ in the long run, even if the mark rate of the information is not ½, thereby avoiding the generation of a DC component in the signal. That is, redundancy is also effectively used to balance the DC component in the signal. Moreover, as the signal always crosses the zero level by the inversion in polarity, extraction of clock signals will not be so difficult. According to the coding system of this invention, the probability to pass through a small open aperture in an eye pattern is less than that of split phase signals, to thereby improve the bit error rate.

By introducing detection of an index value within a receiver, the reliability and bit error rate of received signals are further improved.

DETAILED DESCRIPTION OF THE INVENTION

Figure 1:
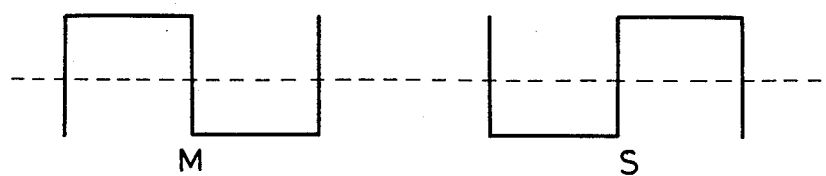
FIG. 1 is an explanatory view of a prior art split phase system.
Figure 2:
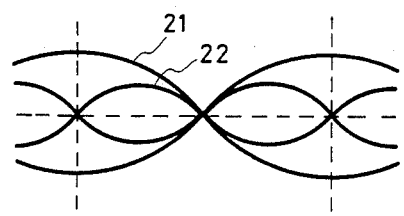
FIG. 2 is an explanatory view of an eye pattern of a split phase system.
Figure 3:
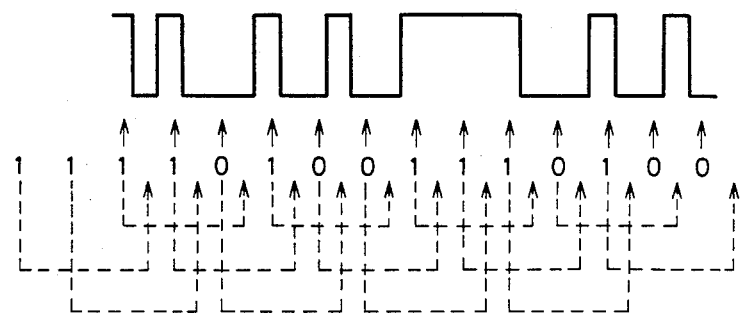
FIG. 3 is a view to explain the code pattern of an embodiment according to this invention.

FIG. 3 shows the transmitted code pattern of the first embodiment of this invention. In the figure, the horizontal axis represents time and the vertical axis the level of the codes. The graph shows a case where the same information is repeated twice at an interval of 5 time-slots in inverted polarities. The broken line in the figure indicates that identical information is repeated in different polarities. In such a system because the interval between repeated signals is 5 time-slots even if one pulsated noise occurs the possibility of the noise simultaneously affecting a latter time slot which is apart by 5 time-slots from the time slot where the noise first occurred, is far less than the possibility for it to affect an adjacent time-slot. Thus redundancy is effectively used. The code inverts the polarity once every 5 time-slots, and the mark rate of signals will become 50% in the long run, avoiding the generation of a DC component in the signals even if the mark rate of the information is not 50%. Whenever the polarity inverts from positive to negative or vice versa, there is always a point where the signal level crosses the zero level. Therefore the extraction of clock signals will never be difficult even if the same code continues.

Figure 4:
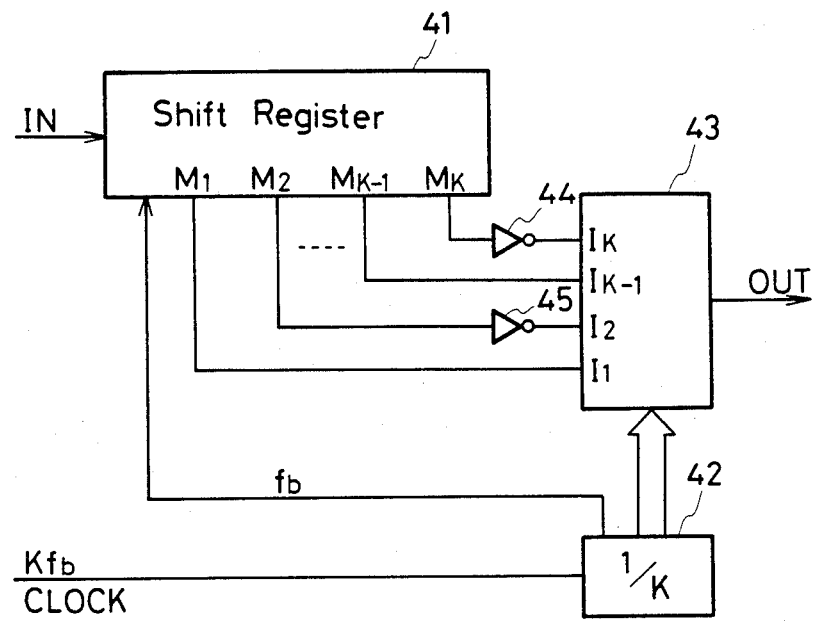
FIG. 4 is a block diagram of a transmitter in an embodiment according to this invention.

FIG. 4 is a block diagram of a transmitter to generate such codes in an embodiment according to this invention. The figure shows the case where the same information is repeatedly transmitted for k times. Where $$k=2, M_1-M_2=2$$

in order to generate the code pattern shown in FIG. 3. The input information is input to a shift register 41 as a series pattern. The clock signal Kfb which synchronizes with said input information is input to a frequency divider 42 and the output fb therefrom is fed to the clock input of the shift register 41. At the shift register 41, signal outputs which are delayed by $M_1$ bits, $M_2$ bits, ... $M_k$ bits respectively are extracted to be fed to the input of a selector 43. An inverter 44 is inserted so as to invert the signals according to the polarity to be transmitted, and the result is fed to the input of a selector 43. The selector 43 is controlled by an output signal from the 1/K frequency divider 42 to select necessary information for output. In other words, the selector 43 is controlled to select consecutively the signals from the inputs $I_1$ to $I_K$ every time a clock signal Kfb is fed and output to OUT. When the selection is completed to the input $I_K$, the shift register 41 shifts once and a decoded signal subsequent thereto is input, thus repeating similar operations.

There will be no DC components in the long run in this type of signal transmission system if it is programmed in such a way as to cause the number of transmissions in positive polarity to coincide with the number of transmissions in negative polarity when the number of repetitions of an information K is an even number. When K is an odd number, the influence from the deviation from 50% in mark rate will be reduced to 1/K if it is programmed to make the difference in the number of transmissions between positive and negative polarities equal to 1.

Figure 5:
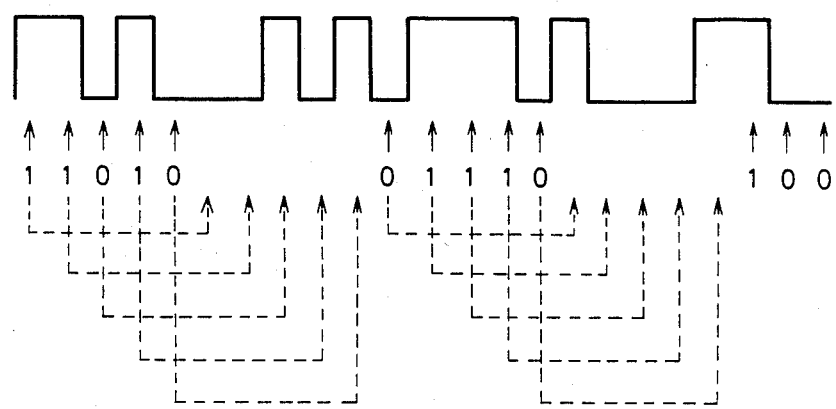
FIG. 5 is an explanatory view of another code pattern of an embodiment according to this invention.

FIG. 5 is a chart to show the code pattern of another embodiment according to this invention. In this case, the same information is repeatedly transmitted in a block of 5 bits to achieve similar effects.

Figure 6:
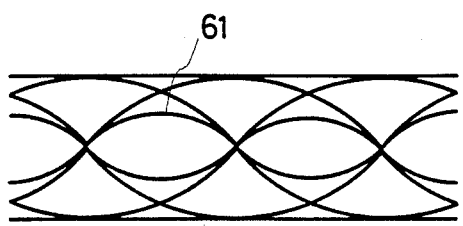
FIG. 6 is an explanatory view of an eye pattern of the codes of an embodiment according to this invention.

If it is assumed that the eye pattern of the code patterns shown in either FIG. 3 or FIG. 5 are influenced only from immediately adjacent bits but not from the bit which is two bits apart therefrom, the eye patterns will be classified into four types as shown in FIG. 6. The probability to pass through the eye pattern having the smallest aperture 61 is $\frac{1}{4}$ if the transmitted information is random, a smaller value compared with the $\frac{1}{2}$ of the split phase signals. The possibility of inter-code interference will therefore be reduced proportionately.

Figure 7:
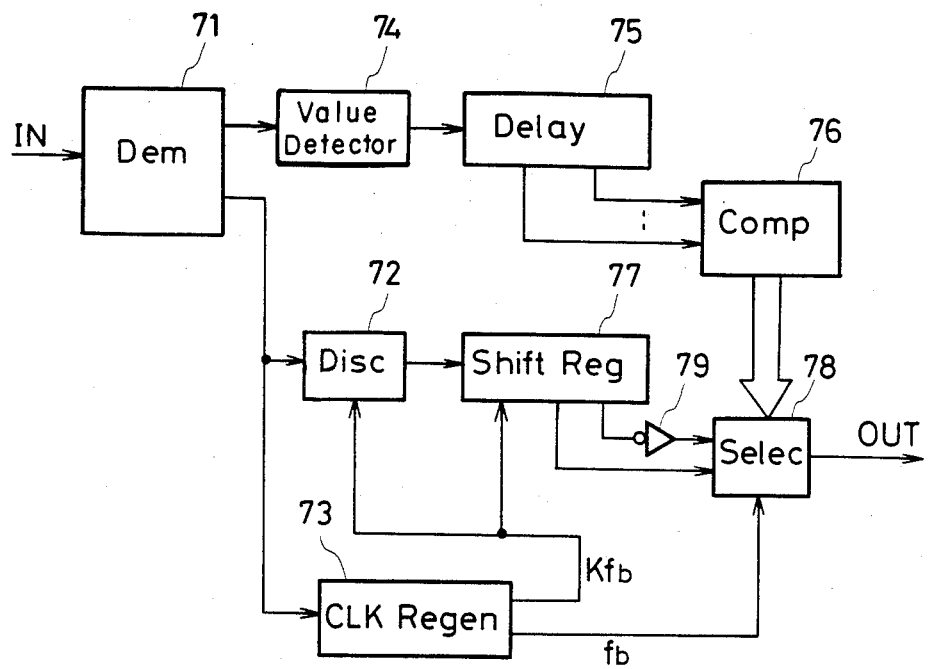
FIG. 7 is a block diagram of a receiver of the first embodiment according to this invention.

FIG. 7 is a block diagram of the first embodiment of a receiver according to this invention. A received signal which has been modulated by a carrier is fed to a demodulator 71 and the demodulated signal (or a base band signal) is input to a decision circuit 72 as well as to a clock recovery circuit 73. The output of the demodulator is connected to a value detector 74. The value detector 74 will be described in detail later. Thus, there is shown an example which detects the amplitude of an input signal when the signal received at the demodulator 71 is an FM signal. The output from the value detector 74 is fed to a delay circuit 75 and held there for a short time, and plural outputs of different delay times are input to a comparator 76. The interval between respective delay times of plural outputs is identical to the interval between the times when the same information is repeatedly received.

The decision circuit 72 is fed with a clock signal Kfb from the clock recovery circuit 73 and the demodulated signal is discriminated and recovered by a known method. The output signal from the decision circuit 72 is fed to a shift register 77 and held there temporarily. Plural outputs of different delay times are taken out from the shift register 77 to be fed to a selector 78. The interval between delay times of these plural outputs is identical to the interval between times when the same information is repeatedly received. An inverter 79 is inserted in a line where an output corresponding to the information received at inverted polarities appears out of the delay outputs from the shift register 77.

In the device constructed as above, the same information which has been repeatedly transmitted for a plural number of times at inverted polarities is rectified into the same polarity and simultaneously appears at the input of the selector 78. At the same time the index values of received signals of the same information appear at the input of a comparator 76. In the comparator 76, the plural indices are compared and the best of all the indices is detected. The selector 78 then selects a demodulation signal corresponding to the received signal having the best index value and supplies the same to output. By using the receiver, therefore, it is possible to select the received signal having the best index value out of the signals of the same information received repeatedly for plural times, to thereby attain the time diversity effect as well as to conduct a signal transmission having an improved bit error rate characteristic.

The value detector 74 has been described hereinabove, as one to detect the amplitude of a received signal if it is an FM signal. In this embodiment, however, it is constructed to detect the size of the envelope of intermediate frequency signals of the demodulator 71 and to pass the detected output into a logarithmic amplifier.

Figure 8:
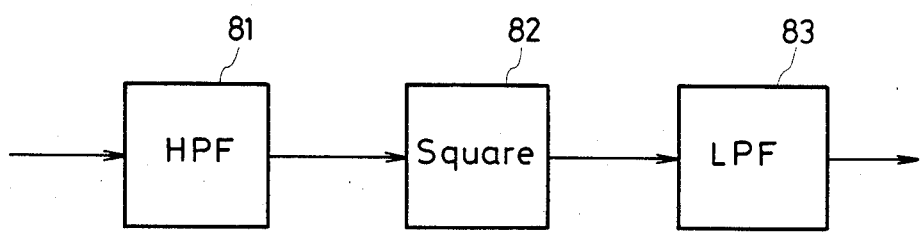
FIG. 8 is a block diagram of an index value detection circuit.

FIG. 8 is a block diagram of still another value detector. In this embodiment, a base band signal which has been demodulated is branched out, passed through a high pass filter 81 to detect noise outside the base band, passed through a square-law circuit 82 to compute the power of the noise and passed through a low pass filter 83 to equalize the same. Use of this circuit will achieve the diversity effect even if deterioration other than lowering of the received power, such as the deterioration of received signals due to interference, occurs.

Figure 9:
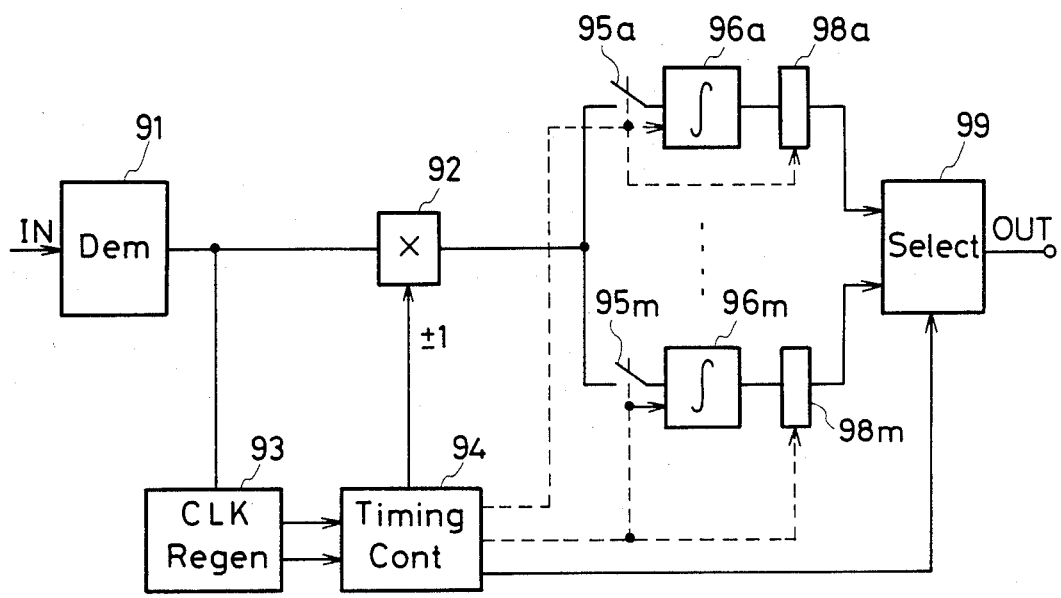
FIG. 9 is a block diagram of a receiver of the second embodiment according to this invention.

FIG. 9 is a block diagram of the second embodiment of the receiver according to this invention. The received signal which has been modulated by a carrier is input to a demodulator 91 and the demodulated signal (or a band base signal) is input to a multiplier 92. The demodulated signal is also fed to a clock recovery circuit 93 so that a clock signal is extracted from the digital signal series. The clock signal is fed to a timing control circuit 94 wherein a signal of $+1$ or $-1$ is generated in synchronism with the inversion of the polarity of the signals of the same information, which has been repeatedly transmitted, and then the generated signal is fed to a multiplier 92. The output of the multiplier 92 is fed with the same information in the same polarity in time series.

The output from the multiplier 92 is distributed to plural gate circuits of the number m, 95a through 95m, and each output therefrom is input to plural integrating circuits of the number m, 96a through 96m respectively. Each output from the integrating circuits 96a through 96m is fed to the input of a selector 99 via comparators 98a through 98m, respectively, for waveforming. The gate circuits 95a through 95m, the integrating circuits 96a through 96m, and the comparators 98a through 98m are controlled by the timing control circuit 94.

In other words, they are so controlled that, when identical information of m bits is repeated for a plural number of times n during transmission, the corresponding bit of the same information is caused to be fed to the same integrating circuits 96a through 96m and the integrating operation is repeated for the number of times n.

The number m of the integrating circuit 96 is determined by the equation below if the number of transmissions of identical information is K and the interval between the first code and the last code is M times slots.

$$m = (M+1)/K$$

Figure 10:
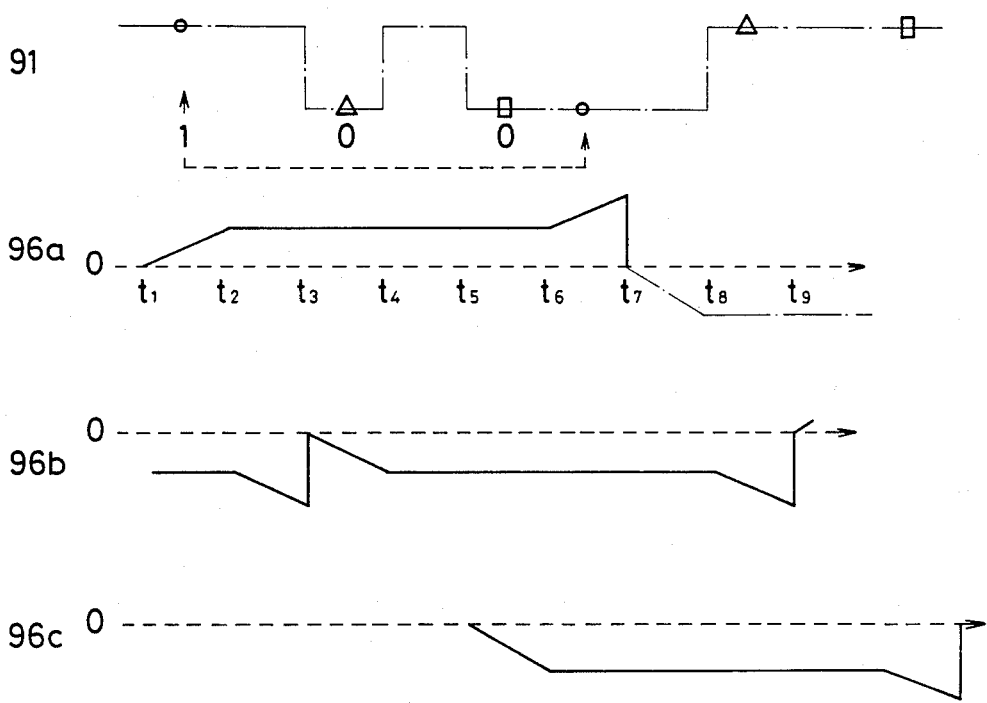
FIG. 10 is an explanatory view to show the operation of an integrating circuit.

FIG. 10 is an explanatory chart of the operation of the integrating circuit 96. In the chart, the reference numeral 91 denotes the output signals from the demodulator 91 and the numerals 96a through 96c respectively denote the output signals from the three integrating circuits 96a through 96c. The demodulated signals are similar to those described in reference to FIG. 3 wherein the identical information is repeated for two times at an interval of 5 bits and in different polarities. The first integrating circuit 96a integrates demodulated signals from the time $t_1$ to $t_2$, holds the values thereof from the time $t_2$ to $t_6$ and further integrates demodulated signals which have been inverted in polarity from the time $t_6$ to $t_7$. At the time $t_7$, the integrated value thereof is compared with the threshold by the comparator 98a for waveform shaping and is fed to the input of the selector 99. The integrating circuit 96a is reset at the time $t_7$ so as to be ready for the subsequent operation. The output from the comparator 98a is selected by the selector 99 and is output as a decoded data output. The second integrating circuit 96b and other integrating circuits thereafter do the similar operation but staggered by one bit each. Therefore, decoded signals in time series without repetition will be recovered in the output of the selector 99.

Figure 11:
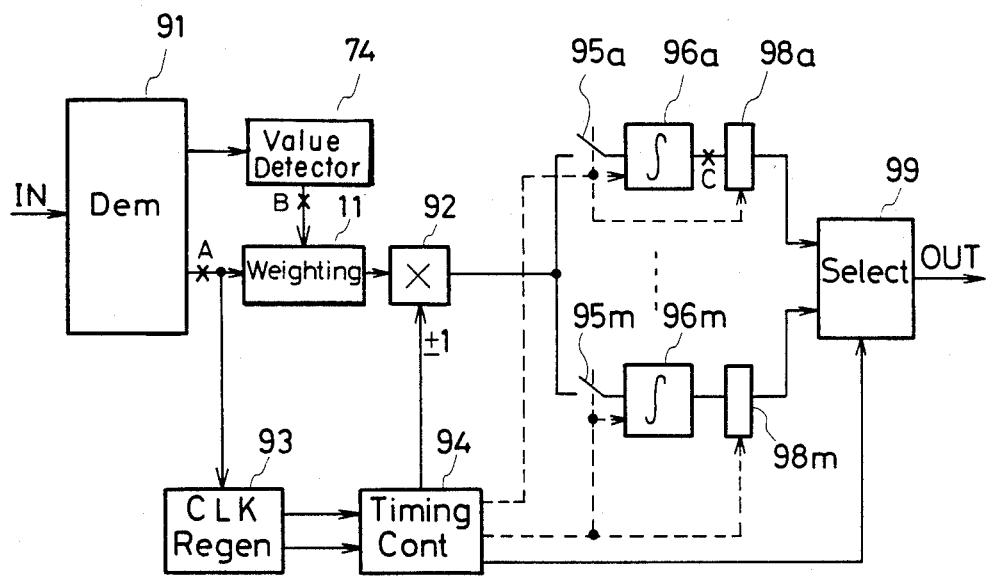
FIG. 11 is a block diagram of a receiver of the third embodiment according to this invention.

FIG. 11 is a block diagram of the third embodiment of the receiver according to this invention. This embodiment is unique in that a value detector 74 and a weighting circuit 11 are added to the circuit which was described referring to the second embodiment in FIG. 9. The rest of the structure is the same as that of the second embodiment shown in FIG. 9. The value detector 74 detects the index value of the signals received from the demodulator 91. An example thereof, as mentioned in the foregoing, is the outband noise power value of a received signal. The weighting circuit 11 is inserted in the line of the base band signal output from the demodulator 91. The weighting circuit 11 adds weight to the demodulated signals according to the index value output from said value detector 74. An example of the weighting circuit 11 is a gain variable amplifier of which gain is controlled by the index value. In summary, the amplitude of an output signal is controlled to be large if it has a high index value while it is controlled to be small if it has a low index value.

Figure 12:
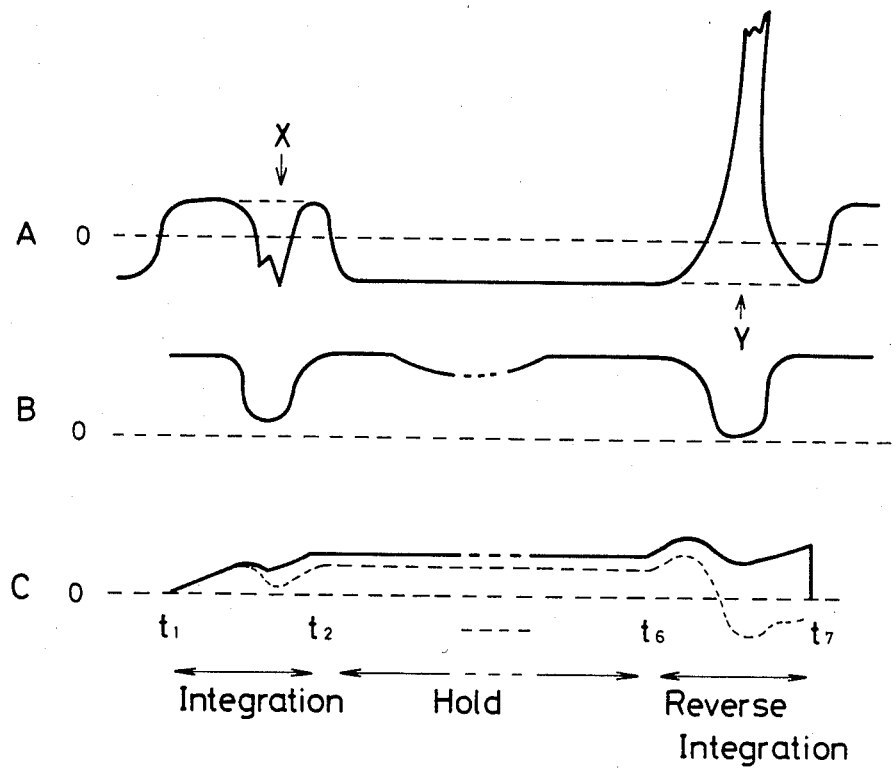
FIG. 12 is a view to explain the effect of a weighting circuit.

FIG. 12 is an explanatory view to show the operation of weighted integration. FIG. 12A shows the output signals from the demodulator 91 wherein noise mixes at the points X and Y. FIG. 12B shows the output evaluation values of the value detector 74 wherein the index values lowers at the points X and Y. FIG. 12C shows the output from the integrating circuit 98a wherein the solid line represents the weighted case and the broken line represents the case without weighting. It is obvious that the influence of the noise on the output from the integrating circuit 98a is reduced by weighting.

Figure 13:
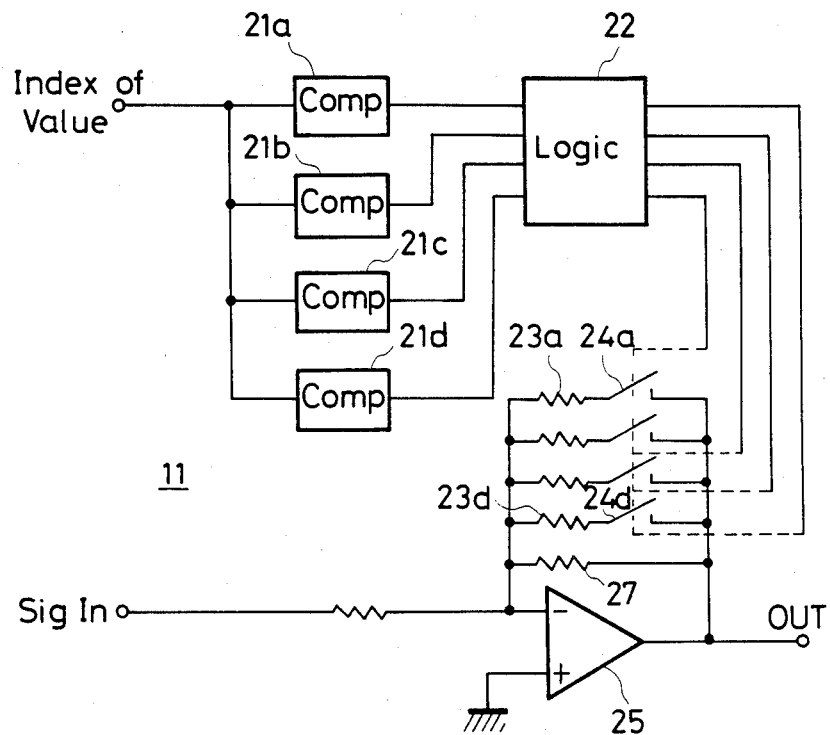
FIG. 13 is a block diagram of a weighting circuit.

FIG. 13 is a block diagram of a weighting circuit 11. The index values are input at four comparataors 21a through 21d of different thresholds so as to classify the index values in a stepwise fashion. A logical operation circuit 22 outputs control output according to the index values. The signal input passes through an amplifier 25 to the output. The amplifier 25 includes feedback resistances 23a through 23d connected, respectively, in series to switch circuits 24a through 24d in a manner that the switch circuits 24a through 24d are selectively opened/closed according to the control signal output from the logical operation circuit 22. In this way, the gain of the signal which passes through the amplifier 25 is varied and the signal is weighted.

Figure 14:
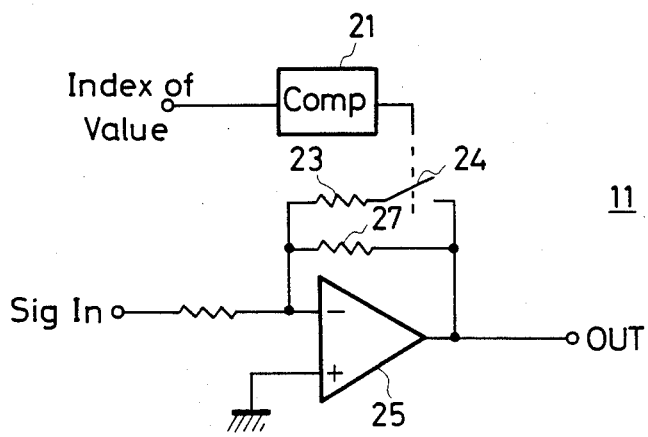
FIG. 14 is a block diagram of another weighting circuit.

FIG. 14 is a block diagram of still another embodiment of the weighting circuit 11. This embodiment has a structure obtained by simplifying the one shown in FIG. 13 wherein only the comparator 21 is used, logical circuits are omitted, the resistance 23 and the switching circuit 24 are limited to only one circuit, and the gain of the amplifier 25 is switched in two steps only.

Figure 15:
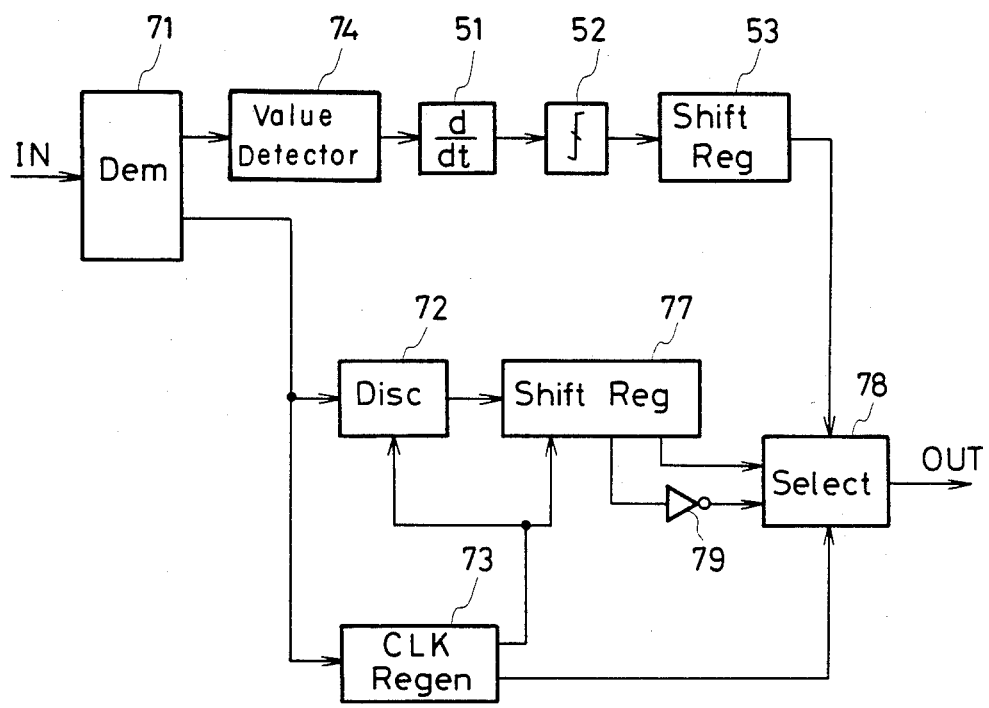
FIG. 15 is a block diagram of a receiver of the fourth embodiment according to this invention.

FIG. 15 is a block diagram of the fourth embodiment of the receiver according to this invention. Compared to the first embodiment shown in FIG. 7, this structure is different therefrom only in the part of the circuit which supplies the output from the value detector 74 to the control input of the selector 78. In this embodiment, the number of transmissions of identical information is two and which one of the two should be selected is determined by the gradient (a differential coefficient) of the index value against time. In other words, the index value fed to the output of the value detector 74 is differentiated against time by a differential circuit 51 and the coefficient thereof is discriminated by a comparator 52 for positiveness or negativeness. The result of the decision is accumulated at the shift register 53 for a while, and then is fed to a control input of the selector 78. As the index value is getting better if the gradient of the index values is positive, the selector 78 selects the latter of the two repeated signals, while as the index value is getting worse if the gradient thereof is negative, the selector selects the former of the two.

Figure 16:
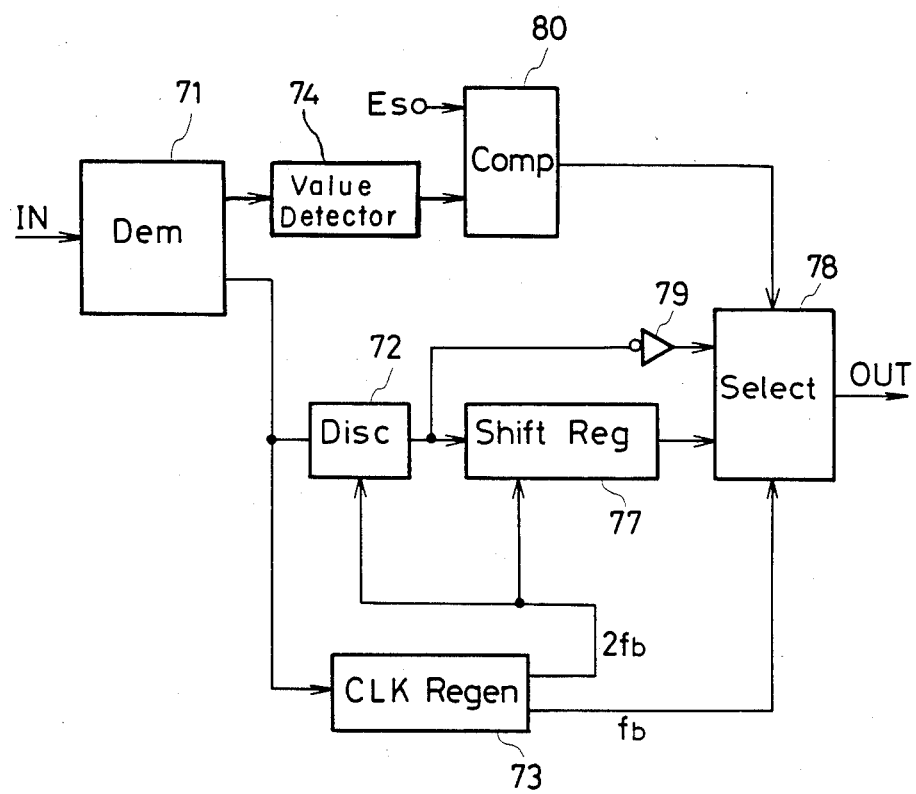
FIG. 16 is a block diagram of a receiver of the fifth embodiment according to this invention.

FIG. 16 is a block diagram of the fifth embodiment of the receiver according to this invention. Unlike the first embodiment shown in FIG. 7, the output from the value detector 74 here is input to a comparator 80 to compare and detect whether the index value has reached a given reference value or not. If this reference value is reached, the information received at that time is selected. On the other hand, if the reference value is not reached yet, the repeated information other than this is selected. In this embodiment the repetition time is two and the first information is accumulated in the shift register 77 for a while. The comparator 80 twice discriminates two index values, and if it has satisfied a given reference, it sends out an output for each time. Clock signals fb are fed to a selector 78 from a clock recovery circuit 73. The selector 78 becomes synchronized and enabled when the second information is received. Therefore, if the second one of the information which has been repeatedly received satisfies a given reference value, the selector 78 will select the second information which is input from the inverter 79 and sends out the same to OUT. If the second index of value does not satisfy the reference value, the selector 78 selects the first information which has been accumulated in the shift register 77 and sends it to OUT. In this construction, the received signals of which index values satisfy a given reference value are fed to OUT. The circuit required for selecting such signals can be constructed simply because its operation is limited to selection alone.

RESULT OF EXPERIMENTS

Figure 17:
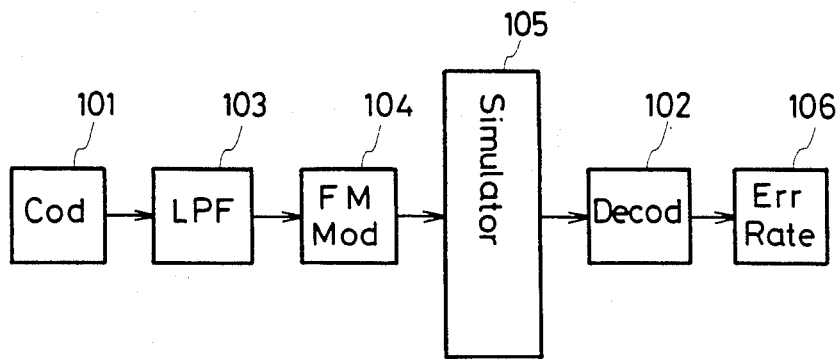
FIG. 17 is a block diagram of a testing apparatus according to this invention.

FIG. 17 is a block diagram of a test apparatus for the system according to this invention. In the figure, a transmitter 101 is identical to the embodiment shown in FIG. 4 and a receiver 102 is identical to the first embodiment shown in FIG. 7. The output signal from the transmitter 101 is passed through a low pass filter 103, fed to a frequency modulation transmitter for mobile radio communication systems and is transmitted to a simulator 105. The receiver 102 connects its input to the simulator 105 and feeds its signal output to an error rate measuring device 106 to measure the error rate. The simulator 105 is a device to artificially generate fading or noise typically caused in a space transmission line between a mobile station and a base station of a land mobile radio communication system used in urban areas. The simulator is widely used for the case where actual transmission of radio waves is prohibited by governmental regulations.

Figure 18:
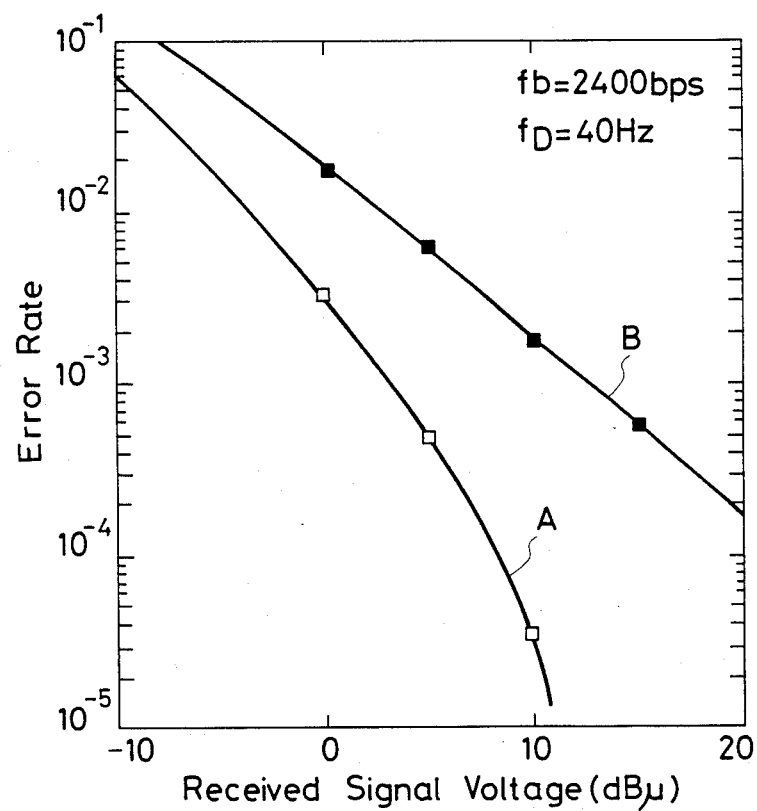
FIG. 18 is a graph to show the result of measurement by said testing apparatus.

FIG. 18 shows test results using the above mentioned apparatus. The clock signals of the transmission data code pattern are set at 2400 bps and the frequency at which artificial fading is repeated is set at 40 Hz. Then the bit error rate is measured against the received voltage (median value). In the graph the letter A represents the result of measurement by the test apparatus according to this invention while the letter B represents that of a similar measurement using split phase codes as a control. It is understood that the bit error rate of the present invention is reduced to be 1/10 to 1/100 that of the conventional split phase code system, depending on the received electric field.

The present invention is quite effective for a land mobile communication system for which the electric field strength drastically changes as it moves, and more particularly for the system of the above type which transmits or receives control signals or other digital signals. In such land mobile communication systems, the communication between an automobile which runs in an urban area and a fixed base station is disturbed by fading which changes the receiving level by several tens of dB at a pitch which runs to several tens of Hz. If this invention is applied for such a system and if the interval between repeated transmission of codes is set at several bits, the time interval will be several mS where the transmission speed is in the order of 1 kbps. The receiving condition, even if disturbed, is thus likely to change and recover. This will contribute to remarkably improving the bit error rate. If the bit error rate should be improved to the same extent by an increase in power, it will be equivalent to about 20 dB. The land mobile communication system is generally constructed to transmit while cutting off the DC level. In this context, the system according to this invention is further effective as it not only repeats identical information in transmission, but inverts the polarity thereof while repeating the information.

What is claimed is:

1. A transmitter for use in a signal transmission system, said transmitter comprising:
   means for accumulating transmitted information temporarily;
   means for inverting the polarity of a code of the transmitted information;
   means for transmitting the same information for a plural number of times n at an interval of more than two time slots later and in one polarity and another polarity opposite thereto; and control means programmed so that the number of transmissions of said one polarity coincides with the number of transmissions of said another polarity when said plural number n is an even number while the difference between the number of transmissions of said one polarity and that of said another polarity is one when said plural number n is an odd number.

2. A signal transmission system, including a transmitter and a receiver, said transmitter comprising:

means for accumulating transmitted informaiton temporarily;

means for inverting the polarity of a code of the transmitted information;

means for transmitting the same information for a plural number of times n at an interval of more than two time slots later and in one polarity and another polarity opposite thereto and control means programmed so that the number of transmissions of said one polarity coincides with the number of transmissions of said another polarity when said plural number n is an even number while the difference between the number of transmissions of said one polarity and that of said another polarity is one when said plural number n is an odd number;

said receiver comprising:

means for value-detecting the quality of a received signal and outputting the index value thereof;

means for accumulating the index value temporarily;

means for comparing said index values corresponding to the same information received in the plural number of times n; and means for selecting a decoded code corresponding to the information having the desired index value judged by the above means.

3. A signal transmission system including a transmitter and a receiver, said transmitter comprising:

means for accumulating transmitted information temporarily;

means for inverting the polarity of a code of the transmitted information;

means for transmitting the same information for a plural number of times n at an interval of more than two time slots later and in one polarity and another polarity opposite thereto; and control means programmed so that the number of transmissions of one polarity coincides with the number of transmissions of another polarity when said plural number n is an even number while the difference between the number of transmissions of one polarity and that of another polarity is one when said plural number n is an odd number;

said receiver comprising:

means for making the decoded code of said one polarity coincide with the decoded code of said another polarity in a same polarity; and means for integrating the signals of the time slots corresponding to the same information which have been aligned in said same polarity by the above means.

4. A signal transmission system including a transmitter and a receiver, said transmitter comprising:

means for accumulating transmitted information temporarily;

means for inverting the polarity of a code of the transmitted information;

means for transmitting the same information for a plural number of times n at an interval of more than two time slots later and in one polarity and another polarity opposite thereto; and control means programmed so that the number of transmissions of said one polarity coincides with the number of transmissions of said another polarity when said plural number n is an even number while the difference between the number of transmissions of said one polarity and that of said another polarity is one when said plural number n is an odd number;

said receiver comprising:

means for making the decoded code of said one polarity coincide with the decoded code of said another polarity in a same polarity;

means for value-detecting the quality of received signals and outputting the index value thereof;

means for weighting demodulated signals according to the index value; and means for integrating the signals of the time slots corresponding to the same information which have been aligned in said same polarity and weighted.

5. A signal transmission system including a transmitter and a receiver, said transmitter comprising:

means for accumulating transmitted information temporarily;

means for inverting the polarity of the code of transmitted information; and means for transmitting the same information for two times at an interval of more than two time slots later and in opposite polarities;

said receiver comprising:

means for value-detecting the quality of received signals and outputting the index value thereof;

means for computing a differential coefficient of the index against time;

means for holding decoded codes temporarily; and means for selecting the latter information out of the same information received twice if said differential coefficient is positive, and for selecting the former information therefrom if said differential coefficient is negative.

6. A signal transmission system including a transmitter and a receiver, said transmitter comprising:

means for accumulating transmitted information temporarily;

means for inverting the polarity of the code of transmitted information; and means for transmitting the same information for two times at an interval of more than two time slots later and in opposite polarities; and said receiver comprising:

means for value-detecting the quality of received signals and outputting the index value thereof;

means for comparing the index value with a reference value; and means for selecting information which has the index value exceeding the reference value out of the same information received for plural times.

* * * * *